United States Patent [19]

Kitada et al.

[11] Patent Number: 4,835,396

[45] Date of Patent: May 30, 1989

[54] RADIOGRAPHIC INTENSIFYING SCREEN AND RADIATION IMAGE PRODUCING METHOD

[75] Inventors: Akira Kitada; Nobuyuki Iwasaki, both of Odawara, Japan

[73] Assignee: Fuji Photo Film Co., Ltd., Kanagawa, Japan

[21] Appl. No.: 146,705

[22] Filed: Jan. 21, 1988

[30] Foreign Application Priority Data

Jan. 21, 1987 [JP] Japan .................................. 62-11900
Jan. 21, 1987 [JP] Japan .................................. 62-11901

[51] Int. Cl.[4] .................................................. G01J 1/58
[52] U.S. Cl. ................................ 250/483.1; 250/486.1
[58] Field of Search ............................ 250/483.1, 486.1

[56] References Cited

U.S. PATENT DOCUMENTS

| | | | |
|---|---|---|---|
| 4,437,011 | 3/1984 | Noji et al. | 250/483.1 |
| 4,472,635 | 9/1984 | Yokota et al. | 250/483.1 |
| 4,507,563 | 3/1985 | Mieoka et al. | 250/486.1 |
| 4,513,078 | 4/1985 | Sandrik et al. | 250/486.1 |

*Primary Examiner*—Carolyn E. Fields
*Assistant Examiner*—Richard Hanig
*Attorney, Agent, or Firm*—Gerald J. Ferguson, Jr.

[57] ABSTRACT

An improvement of a radiographic intensifying screen comprises a support and a phosphor layer provided on the support, in which phosphor particles are arranged in the phosphor layer in such manner that the diameters of the phosphor particles become larger along the depth direction of from the screen surface side to the support side. A radiation image producing method utilizes a screen-film system comprising a radiographic film and a radiographic intensifying screen provided on one side of the film or a screen-film system comprising a radiographic film and two radiographic intensifying screens provided on both sides of the film, in each of which the phosphor layer has the above-mentioned specific particle diameter distribution.

18 Claims, 3 Drawing Sheets

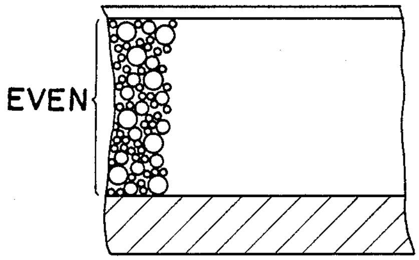
FIG. 3(III)

RADIOGRAPHIC INTENSIFYING SCREEN AND RADIATION IMAGE PRODUCING METHOD

BACKGROUND OF THE INVENTION

1. Field of the Invention

The present invention relates to a radiographic intensifying screen and a radiation image producing method utilizing a screen-film system.

2. Description of the Prior Art

In a various kinds of radiography such as medical radiography for diagnosis and industrial radiography for nondestructive inspection, a radiographic intensifying screen is generally employed in close contact with one or both surfaces of a radiographic film such as an X-ray film.

The radiographic film comprises a support and an emulsion layer provided on one or both surfaces thereof which comprises a binder and a silver halide particles dispersed therein. The radiographic intensifying screen comprises a support and a phosphor layer provided on one surface of th support. The phosphor layer comprises a binder and phosphor particles dispersed therein. When excited with a radiation such as X-rays having passed through an object, the phosphor particles emit light of high luminance in proportion to the dose of the radiation. Accordingly, the radiographic film placed in close contact with the phosphor layer of the intensifying screen can be exposed sufficiently to radiation to form a radiation image of the object, even if the radiation is applied to the object at a relatively small dose.

In a conventional radiography, a screen-film system comprising a combination of a radiographic film and a radiographic intensifying screen is employed. For example, there are known a screen-film system comprising a radiographic film having an emulsion layer on one side (single-sided film) and a radiographic intensifying screen placed on the emulsion layer-side of the film (i.e., single-sided system or single-sided screen-film system), and a screen-film system comprising a radiographic film having two emulsion layers on both sides (double-sided film) and two radiographic intensifying screens (a front screen located on the radiation impinging side and a back screen located on the opposite side of the radiation impinging side) placed on both sides of the film (i.e., double-sided system or double-sided screen-film system).

Generally, the quality of an image (i.e., sharpness, graininess, etc.) obtained by the screen-film system is greatly influenced by the characteristics of a radiographic intensifying screen used in the system, and it is highly desired for the screen to provide an image of high quality.

For enhancing the sharpness of an image, there has been proposed a radiographic intensifying screen comprising phosphor particles having larger diameters arranged on the screen surface side of the phosphor layer (i.e., the side from which the emitted light is detected) and phosphor particles having smaller diameters arranged on the support side of the phosphor layer, as described, for example, in Japanese Patent Publication No. 55(1980)-33560 and Japanese Patent Provisional Publication No. 58(1983)-71500. Otherwise, Japanese Patent Provisional Publication No. 58(1983)-160952 describes as the above-mentioned single-sided system a screen-film system using a radiographic intensifying screen which comprises larger particles of a rare earth element phosphor arranged on the side near the film and smaller particles thereof arranged on the farther side from the film to provide an image of improved sharpness without decreasing the radiographic speed. In a single-sided system employing such radiographic intensifying screen, the radiographic speed can be improved because the particle diameters of the phosphor are relatively large on the side near the film. In other words, the sharpness of an image provided by the system can be enhanced when the radiographic speed of the screen used in the system is the same as a conventional screen having a uniform particle diameter distribution in the direction of thickness of the phosphor layer. Further, the phosphor particles of small diameters arranged on the support side have the same function as that of a reflecting layer, and accordingly the emitted light can be readily detected from the surface of the screen by shortening the passage of reflected or scattered light of the emission, whereby the sharpness of an image (in the low frequency region) can be enhanced.

Also in the case of a double-sided sytem comprising radiographic intensifying screens arranged on both sides of the radiographic film in which the phosphor layer of each screens has the above-mentioned specific particle diameter distribution, the same tendencies as described in the single-sided sytem are observed.

Generally, the radiographic speed of a radiographic intensifying screen becomes higher as the particle diameter of the phosphor is larger, while the sharpness and graininess of an image provided by the screen are more improved as particle diameter thereof is smaller.

SUMMARY OF THE INVENTION

It is an object of the present invention to provide a radiographic intensifying screen which gives an image of high sharpness and high graininess, and a radiation image producing method using the same.

It is another object of the invention to provide a radiation image producing method which has a high radiographic speed and provides an image of high sharpness and high graininess.

There is provided by the invention a radiographic intensifying screen comprising a support and a phosphor layer provided on the support, in which phosphor particles are arranged in the phosphor layer in such manner that diameters of the phosphor particles become larger along the depth direction of from the screen surface side to the support side.

There is also provided by the invention a radiation image producing method utilizing a screen-film system which comprises a radiographic film and a radiographic intensifying screen provided on one side of the radiographic film, wherein said radiographic intensifying screen comprises a support and a phosphor layer provided on the support, and phosphor particles are arranged in the phosphor layer in such manner that diameters of the phosphor particles become larger along the depth direction of from the screen surface side near the radiographic film to the support side.

There is further provided by the present invention a radiation image producing method utilizing a screen-film system which comprises a radiographic film and radiographic intensifying screens provided on the front and back sides of the radiographic film, wherein each of said radiographic intensifying screens comprises a support and a phosphor layer provided on the support, phosphor particles of the phosphor layer of the radiographic intensifying screen provided on the radiation impinging side are arranged in such a manner that diameters of the phosphor particles become smaller along the depth direction of from the screen surface side facing the radiographic film to the support side, and phosphor particles of the phosphor layer of the radiographic intensifying screen provided on the opposite side of the radiation impinging side are arranged in such manner that diameters of the phosphor particles become larger along the depth direction of from the screen surface side facing the radiographic film to the support side.

In the invention, the term "screen surface" means a surface of a radiographic intensifying screen on the opposite side of the support (i.e., surface of the phosphor layer not facing the support) or a surface of a protective film in the case that the protective film is provided on the surface of the phosphor layer.

As a result of a study for obtaining a radiation image of high quality, the present inventors have found that an image of high sharpness and high graininess can be obtained by arranging phosphor particles having larger diameters on the screen surface side of the phosphor layer (i.e., the side from which the emitted light is detected), while phosphor particles having smaller diameters on the support side of the phosphor layer, such arrangement of the phosphor particles being in contrast with the conventional one.

According to the radiographic intensifying screen of the invention, the sharpness and graininess of an image can be prominently improved without noticeably decreasing the radiographic speed and an image of high quality having satisfactory balance between sharpness and graininess can be obtained, as compared with a conventional screen having a uniform particle diameter distribution in the thickness direction of the phosphor layer.

According to the radiation image producing method of the invention utilizing a screen-film system which comprises a radiographic film and the above-mentioned radiographic intensifying screen provided in contact with one side the film (i.e., back side of the film with respect to the radiation impinging direction), an image of high sharpness and high graininess can be obtained without noticeably decreasing the radiographic speed.

Especially in the case of using a single-sided film having an emulsion layer composed of silve halide particles in the plate form as the radiographic film, there can be attained a screen-film system having a high radiographic speed and providing an image of high quality.

Since the silver halide particles of plate form have high covering power, the resulting system is able to show a high radiographic speed and the maximum density (D max) of characteristics curve (showing a relationship between an amount of exposure and a radiographic density, and indicating exposure characteristics of a film) can be kept at a high level, even if the silver halide is used in a small amount. Further, it is sufficient to use a smaller amount of a binder as the amount of silver halide decreases, so tht the same level of the radiographic speed as that of a conventional double-sided film can be obtained even if the thickness of the emulsion layer thereof is almost the same as that of one emulsion layer of the conventional one.

A radiographic film is generally subjected to a radiographic process comprising the steps of developing, fixing, washing with water and drying in a short period of time (e.g., 90 seconds in Dry to Dry Process), and in the case of using the above-mentioned film, various problems such as insufficient fixing, incomplete washing or drying and film-staining by the remaining color hardly take place during the process because the silver halide and binder are contained in small amounts.

Heretofore, with respect to the radiographic speed of a single-sided system, the light emission is hardly released from the screen surface and hence the screen is hardly improved in the radiographic speed even if the thickness of the phosphor layer of the screen is made larger. However, the employment of the above-mentioned single-sided film of high radiographic speed capable of being subjected to the rapid treatment can make it possible to improve the radiographic speed of a single-sided system. Accordingly, the single-sided screen-film system using the above-mentioned radiographic film according to the invention is prominently improved in the radiographic speed as well as the enhancement of the sharpness and graininess of an image provided thereby.

Moreover, the single-sided system using said film provides an image of extremely improved sharpness in the case that the radiographic speed thereof is the same as that of a known double-sided system using conventional two screens comprising phosphor particles arranged in such manner that the particle diameters become larger along the direction of from the support side to the screen surface side.

The present inventors have also found that in a radiation image producing method utilizing a screen-film system comprising a radiographic film and two screens provided on both sides of the film (i.e., double-sided system), the influence given to the system by diameter of the phosphor particles of a phosphor layer of each screen is different between the front side and the back side. That is, an image of high sharpness and high graininess can be obtained without decreasing the radiographic speed by varying diameters of the phosphor particles in the specific direction in the phosphor layer of each screen.

In more detail, the phosphor particles are arranged in such manner that diameters thereof become smaller along the depth direction of from the screen surface side (i.e., the side from which the emitted light is detected and the side facing the film) to the support side in the screen provided on the radiation impinging side (namely, front screen), while the phosphor particles are arranged in such manner that diameters thereof become smaller along the depth direction of from the support side to the screen surface side in the screen provided on the opposite side of the radiation impinging side (namely, back screen).

In this system, a screen comprising the phosphor particles arranged in such manner that diameters thereof become larger along the depth radiation impinging direction is provided on the back side of the system, and hence the phosphor particles having relatively smaller diameters gather on the film side to enhance the sharpness and graininess of an image provided thereby. On the other hand, another screen comprising the phosphor particles arranged in such manner tha diameters thereof become larger along the direction which is the radiation impinging direction as well as the detecting direction of the emitted light is provided on the front side of the system, and hence the phosphor particles having relatively larger diameters gather on the film side to improve the radiographic speed and keep the sharpness of an image provided thereby at the same level as that of a conventional screen having a uniform particle diameter distribution in the thickness direction of the phosphor layer.

By combining the front and back screens having the above-mentioned favorable features, the resulting screen film system can be improved in every viewpoint such as radiographic speed and quality of an image (sharpness, graininess, etc.) provided thereby. Accordingly, a screen-film system well balanced in all properties can be obtained.

DETAILED DESCRIPTION OF THE INVENTION

Figure 1:
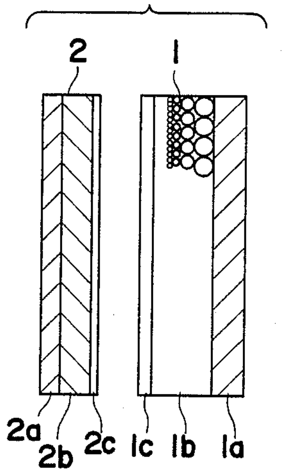
FIG. 1 is a sectional view illustrating a single-sided screen-film system according to the present invention.

A representative example of the radiographic intensifying screen according to the invention is shown in FIG. 1.

FIG. 1 is a sectional view showing a screen-film system according to the invention. In FIG. 1, the radiographic intensifying screen 1 comprises a support 1*a*, a phosphor layer 1*b* and a protective film 1*c*, superposed in this order. In the phosphor layer 1*b*, phosphor particles are arranged in such manner that diameters thereof become larger along the depth direction of from the screen surface side (i.e., protective film side) to the support side.

The above-mentioned structure is given by no means to restrict the invention, and any other structure can be also adopted in the invention, provided that the phosphor particles are arranged in the phosphor layer in such manner that diameters thereof become larger along the depth direction of from the screen surface side to the support side. For example, a variety of additional layers such as a light-reflecting layer and an undercoating layer may be optionally provided among the above-mentioned layers.

The radiographic intensifying screen of the invention can be prepared, for example, by the following process.

The support material employed in the present invention can be selected from those employed in the conventional radiographic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material from the viewpoints of various properties required for radiographic intensifying screens. The plastic film may contain a light-absorbing material such as carbon black, or may contain a light-reflecting material such as titanium dioxide. The former is appropriate for preparing a high-sharpness type radiographic intensifying screen, while the latter is appropriate for preparing a high-speed type radiographic intensifying screen.

On the surface of the support may be provided one or more additional layers to enhance the bonding strength between the support and a phosphor layer to be coated thereon, or to improve the radiographic speed of the screen or the quality of an image provided thereby. For instance, a subbing layer on an adhesive layer may be provided by coatinh a polymer material such as gelatin over the surface of the support on the phosphor layer-side. Otherwise, a light-reflecting layer and a light-absorbing layer may be provided by forming a polymer material layer containing a light-reflecting material such as titanium dioxide or a light-absorbing material such as carbon black. Further, a metal foil may be optionally provided on the phosphor layer-side surface of the support to remove scattered radiation. Such a metal foil is chosen from lead foil, lead alloy foil, tin foil and the like.

As described in U.S. patent application No. 496,278, now U.S. Pat. No. 4,575,635 the phosphor layer-side surface of the support (or the surface of an adhesive layer, light-reflecting layer, light-absorbing layer or metal foil in the case that such layers are provided on the support) may be provided with protruded and depressed portions for enhancement of the sharpness of an image.

On the support is then provided a phosphor layer.

The phosphor layer, which is a characteristic requisite of the invention, basically comprises a binder and phosphor particles dispersed therein.

A variety of phosphors are already known. Preferred are phosphors which emit light having a wavelength within the near ultraviolet to visible region (e.g., blue, green and red region).

Examples of such phosphors are as follows:

- tungstate phosphors such as $CaWO_4$, $MgWO_4$ and $CaWO_4$:Pb;
- terbium activated rare earth oxysulfide phosphors such as $Y_2O_2S$:Tb, $Gd_2O_2S$:Tb, $La_2O_2S$:Tb, $(Y,Gd)_2O_2S$:Tb and $(Y,Gd)_2O_2S$:Tb,Tm;
- terbium activated phosphate phosphors such as $YPO_4$:Tb, $GdPO_4$Tb and $LaPO_4$:Tb;
- terbium activated rare earth oxyhalide phosphors such as LaOBr:Tb, LaOBr-Tb, Tm, LaOCl:Tb, LaOCl:Tb,Tm, GdOBr:Tb and GdOCl:Tb;
- thulium activated rare earth oxyhalide phosphors such as LaOBr:Tm and LaOCl:Tm;
- barium sulfate phosphors such as $BaSO_4$:Pb, $BaSO_4$:$Eu^{2+}$ and $(Ba,Sr)SO_4$:$Eu^{2+}$;
- divalent europium activated alkaline earth metal phosphate phosphors such as $Ba_3(PO_4)_2$:$Eu^{2+}$ and $(Ba,Sr)_3(PO_4)_2$:$Eu^{2+}$;
- divalent europium activated alkaline earth meatl fluorohalide phosphors such as BaFCl:$Eu^{2+}$, BaFBr:$Eu^{2+}$, BaFCl:$Eu^{2+}$, Tb, BaFBr:$Eu^{2+}$, Tb, $BaF_2.BaCl_2.KCl$:$Eu^{2+}$, $BaF_2$. $BaCl_2.xBaSO_4.KCl$:$Eu^{2+}$ and $(Ba,Mg)F_2.BaCl_2.KCl$:$Eu^{2+}$;
- iodide phosphors such as CsI:Na, CsI:Tl, NaI and Ki:Tl;
- sulfide phosphors such as ZnS:Ag, (Zn,Cd)S:Ag, (Zn,Cd)S:Cu, (Zn,Cd)S:Cu and Al;
- hafnium phosphate phosphors such as $HfP_2O_7$:Cu;
- europium activated rare earth oxysulfide phosphors such as $Y_2O_2S$:Eu, $Gd_2O_2S$:Eu, $La_2O_2S$:Eu and $(Y,Gd)_2O_2S$:Eu;

europium activated rare earth oxide phosphors such as $Y_2O_3$:Eu, $Gd_2O_3$:Eu, $La_2O_3$:Eu and $(Y,Gd)_2O_3$:Eu;

europium activated rare earth phosphate phosphors such as $YPO_4$:Eu, $GdPO_4$:Eu and $LaPO_4$:Eu; and europium activated rare earth vanadate phosphors such as $YVO_4$:Eu, $GdVO_4$:Eu, $LaVO_4$:Eu and $(Y,Gd)VO_4$:Eu.

The above-described phosphors are given by no means to restrict the phosphor employable in the present invention. Any other phosphors can be also employed, provided that the phosphor emits a light within the wavelength region of near ultraviolet to visible rays when exposed to a radiation.

In the invention, phosphors having different particle diameters from each other are required. In concrete, two or more kinds of phosphors having different mean particle diameters are employed. For example, a phosphor having a mean particle diameter in the range of 8 to 15 μm is employed as a phosphor having a large diameter, and a phosphor having a mean particle diameter in the range of 2 ti 5 μm is employed as a phosphor having a small diameter. Preferably, three kinds of phosphors having a mean particle diameter of 8 to 15 μm, a mean particle diameter of 5 to 8 μm, and a mean particle diameter of 2 to 5 μm, respectively, are employed.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloridde copolymer, polyalkyl(meth)acrylate, vinyl chloride-vinyl acetate copolymer, polyurethane, cellulose acetate butyrate, polyvinyl alcohol and linear polyester. Particularly preferred are nitrocellulose, linear polyester, polyalkyl(meth)acrylate, a mixture of nitrocellulose and linear polyester, and a mixture of nitrocellulose and polyalkyl(meth)acrylate.

The phosphor layer can be formed on the support, for example, in the following manner.

in the first place, each of the phosphors having different mean particle diameters and the above-mentioned binder are added to an appropriate solvent, and they are well mixed to prepare two or more homogeneous coating dispersions of phosphor particles in a binder solution.

Examples of the solveents employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the amount of the binder and the amount of the phosphor in each of the coating dispersions may be determined according to the characteristics of the aimed radiographic intensifying screen and the nature of the employed phosphors. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

Plural kinds of the coating dispersions containing the phosphor particles and the binder prepared as above are simultaneously applied evenly to the surface of the support in the superposed form to form layers of the coating dispersions. This superposition coating is performed in such a manner that a lyer of the coated dispersion containing phosphor particles having the largest mean diameter is arranged on the support side and layers of coated dispersions containing phosphor particles having smaller mean diameters are arranged on the side farther from the support. The coating procedure can be carried out by a conventional method such as a method using a doctor blade, a roll coater or a knife coater. Then, the coated layers are slowly heated to dryness so as to complete the formation of a phosphor layer on the support.

The phosphor layer of plural layers can be also formed on the support by repeating a process comprising coating each dispersion and drying the coated layer one after another.

The thickness (whole thickness) of the phosphor layer varies depending upon the characteristics of the aimed radiographic intensifying screen, the nature of the phosphors, the ratio between the binder and the phosphor, etc. Generally, the thickness of the phosphor layer is in the range of 20 μm to 1 mm, preferably in the range of 50 to 500 μm.

In the invention, the phosphor particles in the phosphor layer have large diameters in the vicinity of the support and small diameters in the vicinity of the screen surface. Preferably, the phosphor particles are arranged in the phosphor layer in such a manner that the particle diameters thereof become larger along the direction of from the screen surface side to the support side. The particle diameter of the phosphors employable in the invention vary depending on the characteristics of the aimed radiographic intensifying screen. The mean diameter of the phosphor particles in the vicinity of the screen surface side is preferably in the range of 2 to 5 μm, and the mean diameter of the phosphor particles in the vicinity of the support side is in the range of 8 to 15 μm. In the preparation of a phosphor layer using plural kinds of coating dispersions having different mean diameters of the phosphor particles as described above, the ratio between the binder and the phosphor in each dispersion and the amount of each dispersion are appropriately adjusted according to the nature of the phosphor, a mean particle diameter of the phosphor, etc.

The phosphor layer can be provided onto the support by the methods other than that given in the above. For instance, the phosphor layer is initially prepared on a sheet (false support) such as a glass plate, metal plate or plastic sheet using the aformentioned coating dispersions and then thus prepared phosphor layer is superposed on the genuine support by pressing or using an adhesive agent.

On the free surface of the phosphor layer (surface not facing the support) may be provided a transparent film to protect the phosphor layer from physical and chemical deterioration.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness ranging from approx. 3 to 20 μm.

A radiographic film employable in the radiation image producing method of the invention basically comprises a support and an emulsion layer provided on one surface of the support.

Examples of the support material employable in the radiographic film include a plastic film such as a film of polyethylene terephthalate. The plastic film may be colored with an appropriate colorant such as a red dye or a blue dye to cut off the cross-over light to enhance the the image quality.

The emulsion layer comprises a binder such as gelatin and a silver halide dipersed therein.

Examples of the silver halide include AgCl, AgBr, AgI and mixed crystals thereof. The silver halide may be in the form of a regular particle (e.g., particle of hexahedron, octahedron or tetrahedron and epixial particle) or an irregular particle (e.g., particle of plate form or spherical form). Among them, most preferred is a silver halide particle of plate form because it has a high covering power when subjected to a developing procedure, and hence an image can be obtained using a small amount of the silver halide. Further, since the silver halide particle of plate form has a large specific surface area, a large amount of a sensitizing dye can be adsorbed on the surface of the particle without accompanying inherent desensitization of a silver halide. Moreover, the light-absorption coefficient of the sensiizing dye is larger than the light-absorption coefficient of indirect transition of the silver halide, so that the light emitted by the phosphor is almost absorbed by the dye to prominently decrease the cross-over light. In addition, the plate particles of the silver halide are arranged in parallel with the surface of the support when subjected to coating and drying, and thereby the applied light is prevented from scattering in the lateral direction to advance depthwise in the emulsion layer without spreading in the lateral direction.

The plate particles of the silver halide employable in the invention generally have a mean diameter in the range of 0.4 to 10 μm, preferably in the range of 0.5 to 5 μm. The ratio of the mean thickness to the mean diameter (diameter/thickness) thereof is generally in the range of 4 to 20, preferably in the range of 6 to 15.

The emulsion layer can be formed on the support, for example, by coating a gelatin solution containing the silver halide particles on the surface of the support and drying the coated solution. The gelatin solution may contain other additives such as a sensitizing dye and a coupler. The silver halide is contained in the emulsion layer generally in an amount of 1 to 20 g/m$^2$, preferably 2 to 10 g/m$^2$, per unit area of the emulsion layer. The thickness of the emulsion layer is generally in the range of 1 to 50 μm.

On the emulsion layer, a surface-protective layer such as a gelatin layer may be provided to physically and chemically protect the emulsion layer.

The radiographic intensifying screen and the single-sided radiographic film composing a single-sided screen-film system utilized in the radiation image producing method of the invention are described hereinbefore.

The present invention also provides a radiation image producing method utilizing other screen-film system comprising a double-sided radiographic film and two radiographic intensifying screens (i.e., front screen and back screen) provided on both sides of the film. The radiographic intensifying screens and the double-sided radiographic film employable in this system are described below.

Each of the front and back screens employable in this system basically comprises a support and phosphor layer provided thereon as well as in the aforementioned radiographic intensifying screen used in the single-sided system, and other functional layers (e.g., a light-reflecting layer, a light-absorbing layer, an undercoating layer and a protective film) may be provided for the same purposes as described above.

The front and back screens employable in the system can be prepared basically in the same manner using the same materials as that of the radiographic intensifying screen as described before. However, in the preparation of the front screen, phosphor particles having the smallest mean particle diameter are arranged on the support side of the phosphor layer and phosphor particles having a larger mean particle diameter are arranged on the screen surface side of the phosphor layer, while in the preparation of the back screen, phosphor particles having the largest mean particle diameter are arranged on the support side of the phosphor layer and phosphor particles having a smaller mean particle diameter are arranged on the screen surface side of the phosphor layer.

A radiographic film employable in the method utilizing the above system basically comprises a support and emulsion layers provided on both surfaces thereof. That is, the film is a double-sided film.

The support material can be selected from those used in the preparation of the aforementioned single-sided radiographic film.

The emulsion layer comprises a binder such as gelatin and silver halide grains dispersed in the binder. The emulsion layer which is blue-sensitive (namely, a regular-sensitive emulsion layer) can be formed on the support, for example, by coating a gelatin solution containing silver bromoiodide particles (AgBrI) onto the support and drying the coated solution. Otherwise, the emulsion layer which is green-sensitive (namely, orthsensitive emulsion layer) or red-sensitive (namely, panchromatic emulsion layer) can be formed on the support, for example, by applying a gelatin solution containing silver bromoiodide particles which carry a sensitizing dye such as a red dye thereon onto the support and heating the solution to dryness.

The silver halide can be in the form of a spherical particle or a plate particle. The silver halide is contained in the emulsion layer in an amount ranging from 2 to 10 $g/m^2$, preferably from 3 to 5 $g/m^2$, per unit area of the emulsion layer. As the red dye, cyanine dye, merocyanine dye and the like can be employed. The thickness of the emulsion laer is generally in the range of 1 to 20 $\mu m$.

The radiographic film may be provided with surface-protective layers such as gelatin layers on both surfaces thereof to physically and chemically protect the emulsion layers.

The radiation image producing method of the present invention using the screen-film system (single-sided system) comprising a combination of a single-sided radiographic film and a radiographic intensifying screen which contains phosphor particles having different mean particle diameters in the direction of thickness of the phosphor layer will be described hereinafter, by referring to the attached drawings.

Figure 2:
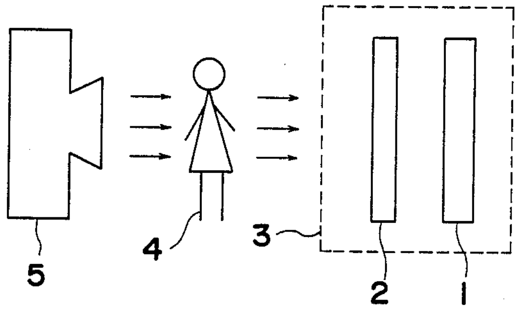
FIG. 2 is a schematic view illustrating a radiation image producing method utilizing a single-sided system according to the present invention.

FIG. 1 is a sectional view illustrating a screen-film system (single-sided system) according to the invention. FIG. 2 is a schematic view illustrating the radiation image producing method of the invention utilizing the screen-film system shown in FIG. 1.

In FIG. 1, a radiographic intensifying screen 1 comprises a support 1*a*, a phosphor layer 1*b* and a protective film 1*c*, and phosphor particles in the phosphor layer 1*b* are arranged in such a manner that the diameters of the phosphor particles become larger along the direction of from the screen surface side to the support side (i.e., in the impinging direction of radiation). The radiographic film 2 comprises a support 2*a*, an emulsion layer 2*b* provided on one surface of the support and a surface-protective layer 2*c* provided on the emulsion layer. The protective film 1*c* of the screen 1 and the surface-protective layer 2*c* of the film 2 are arranged to face each other.

In FIG. 2, a screen-film system 3 comprises a radiographic film 2 positioned on the radiation impinging side and a radiographic intensifying screen 1 placed on the back side of the film 2. The screen-film system 3 is arranged to face a radiation generating device 5, and an object 4 is placed between the system 3 and the radiation generating device 5.

A radiation provided by the radiation generating device 5 passes through the object 4. To a portion of the radiation, the film 2 is directly exposed. The remaining portion passes through the film 2 and is absorbed by the phosphor particles in the screen 1 and converted to light emission. To the emitted light, the film 2 which is adjacent to the screen 1 is further exposed.

Thus, a radiation image of the object is produced on the film 2. The film having the radiation image thereon is subjected to developing treatment to obtain a visible image on the film.

The radiation image producing method of the present invention using the screen-film system (double-sided system) comprising a combination of a double-sided radiographic film and two radiographic intesifying screens (front screen and back screen) which contain phosphor particles having different particle diameters in the thickness direction of the phosphor layer will be also described hereinafter, by referring to the attached drawings.

Figure 4:
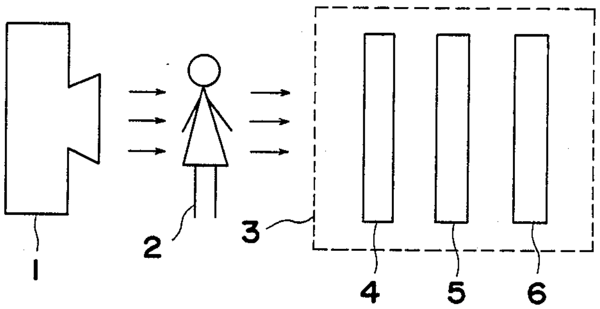
FIG. 4 is a schematic view illustrating a radiation image producing method utilizing a double-sided system according to the present invention.
Figure 5:
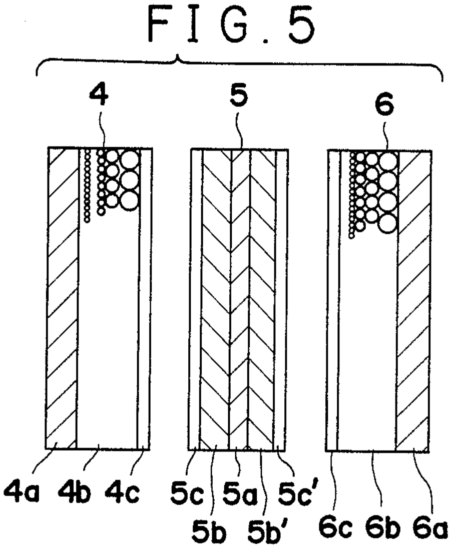
FIG. 5 is a sectional view illustrating a double-sided screen-film system according to the present invention.

FIG. 4 is a schematic view illustrating the radiation image producing method, and FIG. 5 is an enlarged sectional view of a screen-film system shown in FIG. 4.

In FIG. 4, a screen-film system 3 comprises a radiographic film 5 placed in the center of the system and two radiographic intensifying screens 4, 6 placed on both sides of the film 5. The screen 4 is a front screen located on the X-rays impinging side, and screen 6 is a back screen located on the back side of the film 5. In detail, both screens 4, 6 are arranged to interpose the film 5 therebetween. A screen-film system 3 is arranged to face a radiation generating device 1, and an object 2 is placed between the system 3 and the radiation generating device 1.

As shown in FIG. 5, the front screen 4 comprises a support 4*a*, a phosphor layer 4*b* and a protective film 4*c*, superposed in this order, and the surface of the protective film faces the radiographic film 5. The phosphor particles in the phosphor layer 4*b* are arranged in such a manner that diameters thereof become larger along the depth direction of from the support side to the screen surface side (i.e., in the impinging direction of X-rays and in the direction of the side for detecting the light emission). The phosphor particles in the phosphor layer 6*b* are arranged in such manner that diameters thereof become larger along the depth direction of from the screen surface side to the support side (i.e., in the impinging direction of X-rays). The radiographic film 5 comprises a support 5*a*, emulsion layers 5*b*, 5*b*' *provided on both surfaces of the support, and surface-protective layers 5c, 5c'* provided on the emulsion layers.

A radiation provided by a radiation generating device 1 passes through an object 2. A portion of the radiation having passed through the object is absorbed by the phosphor particles in the screen 4 and converted into light emission. To the emitted light, the film 5 which is arranged adjacent to the screen 4 is exposed. Another portion of the radiation having passed through the screen 4 and the film 5 is absorbed by the phosphor particles of the screen 6 and converted to light emission. To the emitted light, the film 5 which is arranged adjacent to the screen 6 is further exposed.

Thus, a radiation image of the object is produced on the film 5. The film having the radiation image thereon is subjected to developing treatment to obtain a visible image on the film.

In general, the image quality is greatly influenced by the reflection or scattering of the emitted light in a back screen. However, since the phosphor particles having small diameters exist on the radiographic film-side of the back screen 6, the graininess of the resulting image can be prominently improved, and in addition, the passages of the reflection or scattering of the emitted light can be restrained to the shortest level so as to remarkably enhance the sharpness of the image.

On the contrary, the phosphor particles having large diameters exist on the film-side of the front screen 4, said side largely contributing to the formation of an image, so that a high radiographic speed can be obtained. The sharpness of an image is generally improved when the diameters of phoshor particles are small. The front screen 4, however, can give the same level of sharpness to the resulting image as that given by the conventional screen which has a uniform particle diameter distribution in the depth direction (thickness direction), because the screen is positioned on the impinging side of X-rays.

The present invention will be further illustrated by the following examples, but these examples by no means restrict the invention.

EXAMPLE 1

(1) Preparation of radiographic intensifying screen

To a mixture of terbium activated gadolinium oxysulfide phoshor particles ($Gd_2O_2S$:Tb, mean particle diameter: 4.4 μm) and a linear polyester (trade name: Byron #500, manufactured by Toyobo Co., Ltd.) were successively added methyl ethyl ketone and nitrocellulose (nitration degree: 11.5%), to prepare a dispersion containing phosphor particles. Subsequently, tricresyl phoshate, n-butanol and methyl ethyl ketone were added to the dispersion and the mixture was sufficiently stirred by means of a propeller agitater to obtain a homogeneous coating dispersion A having a mixing ratio of 10:1 (phosphor:binder, by weight) and a viscosity of 25–35 PS (at 25° C.).

The above procedure was repeated except for using terbium activated gadolinium oxysulfide phoshor particles (mean particle diameter: 6.0 μm) to prepare a coating dispersion B. The above procedure was further repeated except for using terbium activated gadolinium oxysulfide phosphor particles (mean particle diameter: 9.6 μm) to prepare a coating dispersion C.

The coating dispersions obtained as above were evenly applied to a polyethylene terephthalate sheet containing titanium dioxide (support, thickness: 250 μm) placed horizontally on a glass plate in such manner that the dispersions are superposed in the order of A, B and C from the farthesrt side of the support. The application of the coating dispersions was carried out using a doctor blade. The support having layers of the coating dispersions were then placed in an oven and heated to dryness at a temperature gradually rising from 25° to 100° C. Thus, a phosphor layer comprising the coated layers of the dispersions C, B and A in this order and having whole thickness of approx. 180 μm in dry basis (dry thickness of each layer: approx. 60 μm) was formed on the support.

On the phosphor layer was placed a transparent polyethylene terephthalate film (thickness: 12 μm; provided with a polyester adhesive layer on one surface) to combine the transparent film and the phosphor layer with the adhesive layer.

Figure 3I:
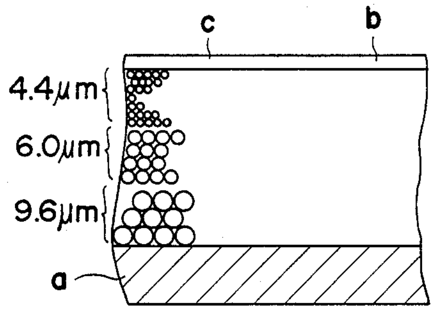
FIG. 3 is sectional views illustrating examples of radiographic intensifying screens, in which FIG. 3-(I) shows a screen of the present invention and FIGS. 3-(II) and 3-(III) show conventional screens.
Figure 3:
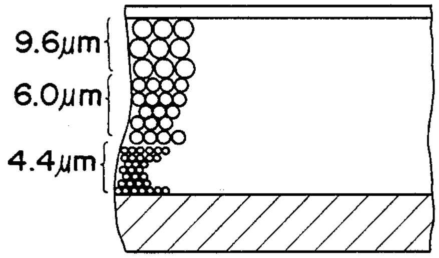

Thus, a radiographic intensifying sreen I consisting essentially of a support, a phosphor layer in which the diameters of phosphor particles become larger along the direction of from the screen side to the suppport side, and a transparent protective film was prepared (see: FIG. 3-(I), a: support, b: phosphor layer, c: protective film).

(2) Radiographic procedure (production of radiation image)

The radiographic intensifying screen obtained as above and a single-sided radiographic film (trade name: Fuji MI-NH, available, from Fuji Photo Film Co., Ltd.) were combined therewith in a cassette to set such a screen-film system as the system in FIG. 1. The radiographic film was exposed to X-rays in the arrangement as shown in FIG. 2.

After the exposure to X-rays, the radiographic film was developed to obtain a visible image.

COMPARISON EXAMPLE 1

The procedure for preparing a radiographic intensifying screen in Example 1 was repeated except for arranging the coating dispersions in such an order as A, B and C from the nearest side of the support, to prepare a radiographic intensifying screen II consisting essentially of a support, a phosphor layer in which diameters of phosphor particles become smaller along the direction of from the screen surface side to the support side, and a transparent protective film (see, FIG. 3-(II)).

The radiographic procedure in Example 1 was repeated except for using the screen prepared as above to obtain a visible image on the radiographic film.

COMPARISON EXAMPLE 2

The dispersions A, B and C prepared in Example 1 were mixed therewith in the same amounts as each other to prepare a coating dispersion containing phosphor particles of various diameters.

The procedure for preparing a radiographic intensifying screen in Example 1 was repeated except for using only the coating dispersion obtained as above, to prepare a radiographic intensifying screen III consisting essentially of a support, a phosphor layer having a uniform particle diameter distribution and a transparent protective film (see FIG. 3-(III)).

The radiographic procedure in Example 1 was repeated except for using the screen prepared as above to obtain a visible image on the radiographic film.

The above-stated radiographic intensifying screens and radiographic procedures were evaluated on the sharpness and graininess of an image provided thereby and the radiographic speed thereof according to the following tests.

(1) Sharpness of image

The screen-film system was exposed to X-rays at voltage of 80 KVp through a resolution chart. The radiographic film was then developed to obtain a visible image, and the contrast transfer function (CTF) value of the visible image was determined. The CTF value was given as a value at the spatial frequency of 2 cycle/mm.

(2) Graininess of image

The screen-film system was exposed to X-rays at voltage of 80 KVp through a water phantom (thickness: 10 cm) and an aluminum plate (thickness: 10 mm) at the density of 1.2. The radiographic film was then developed using a developing solution (trade name: RD III, manufactured by Fuji Photo Film Co., Ltd.) by an automatic developing machine (trade name: New RN, manufactured by the same) for 90 sec. at 35° C., to obtain a visible image on the film. The film was measured to determine the RMS value by the use of a microphotometer (aperture: 300 μm×300 μm).

(3) Radiographic speed

The screen-film system was exposed to X-rays at voltage of 80 KVp. The radiographic film was then developed to obtain a visible image, and the radiographic speed of the system was determined based on the density of the obtained image.

The results of the evaluations are set forth in Table 1.

TABLE 1

| | Sharpness (%) | Graininess | Relative Speed |
|---|---|---|---|
| Example 1 | 46 | $1.65 \times 10^{-2}$ | 95 |
| Com. Example 1 | 39 | $2.05 \times 10^{-2}$ | 105 |
| Com. Example 2 | 41 | $1.75 \times 10^{-2}$ | 100 |

As is evident from the results set forth in Table 1, the radiation image producing method using the screen-film system shown in FIG. 1 according to the present invention (Example 1) was prominently improved in the sharpness and graininess of an image provided thereby, though the radiographic speed thereof somewhat decreased, as compared with the conventional method using the conventional radiographic intensifying screen III having a uniform particle diameter distribution in the thickness direction of the phosphor layer (Comparison Example 2).

Further, the method of the invention (Example 1) was also highly improved in the sharpness and the graininess of an image provided thereby, as compared with the conventional method using the conventional screen II in which phosphor particles of larger diameters were arranged on the film side (Comparison Example 1).

EXAMPLE 2

(1) Preparation of radiographic film

To 1 l of water were added 6 g of potassium bromide, 25 g of gelatin and 20 cc of a 0.5 wt.% solution of thioether [$OH(CH_2)_2S—(CH_2)_2S(CH_2)_2OH$], and the mixture was kept at 60° C. To the mixture were then simultaneously added 30 cc of a silver nitrate solution of 0.88M and 30 cc of a halogen solution of 0.88M containing potassium bromide and potassium iodide in a mixing ratio of 96:4 (potassium bromide:potassium iodide, by mol) for 30 seconds.

Subsequently, to the mixture were simultaneously added 600 cc of a silver nitrate solution of 1.70M and 600 cc of a halogen solution of 1.75M containing potassium bromide and potassium iodide in a mixing ratio of 96:4 (potassium bromide:potassium iodide, by mol) for 70 minutes to prepare an emulsion. The temperature of the emulsion was lowered, and the emulsion was desalted by means of a precipitation method and washed with water. Then the emulsion was chemically sensitized with a gold sensitizing agent and a sulfur sensitizing agent at 55° C. for 100 minutes.

Thus, an emulsion comprising silver bromoiodide particles of plate form (mean particle diameter: 1.25 μm, ratio of diameter to thickness: 7.8) containing 4 mol % of silver iodide was prepared.

To the emulsion were then added 500 mg of a green-sensitizing dye [anhydro-5,5′-dichloro-9-ethyl-3,3′-di(3-sulfopropyl)oxacarbocyaninehydroxide sodium salt] and 50 mg of potassium iodide per 1 mol of silver. The emulsion was further added 4-hydroxy-6-methyl-1,3,3a,7-tetrazaindene and polyacrylamide (mean molecular weight: 47,000), to prepare a coating solution for the preparation of an emulsion layer having a ratio of gelatin to silver of 0.86 (gelatin/silver, by weight).

Independently, gelatin, polymethyl methacrylate particles (matting agent), t-octylphenoxyethoxyethane sodium sulfonate (coating assisting agent), polyethylene oxide (antistatic agent) and a film-hardening agent were mixed to prepare a gelatin solution (a coating solution for the preparation of a surface-protective layer).

Subsequently, the coating solution for the preparation of an emulsion layer and the coating solution for the preparation of a surface-protective layer were simultaneously applied to a polyethylene terephthalate sheet (support, thickness: 180 μm) by a simultaneous extrusion-coating method, and heated to dryness to form a single-sided radiographic film consisting of a support, an emulsion layer and a surface-protective layer, superposed in order. The amount of silver contained in the emulsion layer was 3.5 g/m$^2$, the amount of gelatin contained in the emulsion layer was 3 g/m$^2$, and the amount of gelatin in the surface-protective layer was 1.2 g/m$^2$.

(2) Radiographic procedure (production of radiation image)

The radiographic intensifying screen obtained in Example 1 and the radiographic film prepared as above were combined therewith in a cassette to set such a screen-film system as the system shown in FIG. 1. The radiographic film was exposed to X-rays in the arrangement as shown in FIG. 2.

After the exposure to X-rays, the radiographic film was developed to obtain a visible image.

EXAMPLE 3

The procedure for preparing a radiographic film in Example 2 was repeated except for using an emulsion containing particles of spherical form (mean diameter of spherical particles: 1.0 μm) instead of the emulsion containing particles of plate form, to prepare a single-sided radiographic film consisting of a support, an emulsion layer and a surface-protective layer, superposed in order. The amount of silver contained in the emulsion layer was 7.0 g/m$^2$, and the amount of gelatin contained in the emulsion layer was 6 g/m$^2$. The ratio of gelatin to silver in the emulsion layer was 0.86 (gelatin/silver, by weight).

The radiographic procedure in Example 2 was repeated except for using the radiographic film prepared as above to obtain a visible image on the film.

EXAMPLE 4

The procedure for preparing a radiographic film in Example 2 was repeated except for using an emulsion containing particles of spherical form (mean diameter of spherical particles: 1.0 μm) instead of the emulsion containing particles of plate form, to prepare a single-sided radiographic film consisting of a support, an emulsion layer and a surface-protective layer, superposed in order. The amount of silver contained in the emulsion layer was 7.0 g/m$^2$, and the amount of gelatin contained in the emulsion layer was 3 g/m$^2$. The ratio of gelatin to silver in the emulsion layer was 0.43 (gelatin/silver, by weight).

The radiographic procedure in Example 2 was repeated except for using the radiographic film prepared as above to obtain a visible image on the film.

EXAMPLE 5

The procedure for preparing a radiographic film in Example 2 was repeated except for using an emulsion containing particles of spherical form (mean diameter of spherical particles: 0.6 μm) instead of the emulsion containing particles of plate form, to prepare a single-sided radiographic film consisting of a support, an emulsion layer and a surface-protective layer, superposed in order. The amount of silver contained in the emulsion layer was 3.5 g/m$^2$, and the amount of gelatin contained in the emulsion layer was 3 g/m$^2$. The ratio of gelatin to silver in the emulsion layer was 0.86 (gelatin/silver, by weight).

The radiographic procedure in Example 2 was repeated except for using the radiographic film prepared as above to obtain a visible image on the film.

Each of the radiographic procedures in Example 2 to 5 was evaluated on the graininess of an image provided thereby and the radiographic speed thereof according the aforementioned tests, and further evaluated on the tendency of film-drying and the occurrence of film-staining by the remaining dye according to the following tests. Furthermore, fogging and D max of the film were determined from the characteristic curve.

(4) Tendency of film-drying

After the X-ray photographic procedure, the radiographic film was subjected to treatments of developing to drying (Dry to Dry method) for 90 seconds by the use of an automatic developing machine. Then the film was examined on the tendency of drying through an eye judgement and touch with a hand. The results are classified into the following.

A: film was thoroughly dried;
B: film was a little moistened;
C: film was insufficiently dried; and
D: film was never dried.

(5) Film-staining

After the drying procedure as described above, the film was observed on the occurrence of staining by the remaining dye through an eye judgement. The results are classified into the following.

A: no stain was observed;
B: some stains was observed;
C: a relatively number of stains were observed; and
D: a great number of stains were observed.

The results of the evaluations are set forth in Table 2.

TABLE 2

| Example | Particle Form (μm) | Gelatin/Ag (by wt.) | Ag (g/m$^2$) | Gelatin (g/m$^2$) | Relative Speed |
|---|---|---|---|---|---|
| 2 | spherical form (diameter: 1.25) (thickness: 0.16) | 0.86 | 3.5 | 3 | 100 |
| 3 | spherical form (diameter: 1.0) | 0.86 | 7.0 | 6 | 95 |
| 4 | spherical form (diameter: 1.0) | 0.43 | 7.0 | 3 | 90 |
| 5 | spherical form | 0.86 | 3.5 | 3 | 50 |

| Example | Fogging | D max | Graininess | Tendency of Drying | Film-Staining |
|---|---|---|---|---|---|
| 2 | 0.16 | 3.30 | $1.7 \times 10^{-2}$ | A | A |
| 3 | 0.16 | 3.35 | $1.68 \times 10^{-2}$ | C | D |
| 4 | 0.16 | 3.40 | $2.1 \times 10^{-2}$ | B | C |
| 5 | 0.14 | 3.30 | $1.75 \times 10^{-2}$ | A | A |

As is evident from the results set forth in Table 2, among the radiation image producing methods of the invention, particularly the method using a radiographic film containing silver bromoiodide particles of plate form (Example 2) was highly improved in the radiographic speed and graininess of an image provided thereby, as compared with the methods using a radiographic film containing the conventional silver bromoiodide particles of spherical form (Examples 3 to 5). The method of Example 2 was satisfactory in the fogging and the maximum density (D max). Additionally, insufficient drying of the film and film-staining caused by the remaining dye were never observed in the method of Example 2.

On the other hand, the method using a radiographic film containing the particles of spherical form showed a relatively high radiographic speed but brought about insufficient drying of the film and film-staining, in the case that silver and gelatin were both contained in large amounts (Example 3). In the case of increasing the amount of silver only (Example 4), the method provided an image of low graininess and brought about film-staining. In the case of using the spherical particles of smaller diameters (Example 5), the method showed a markedly low radiographic speed.

EXAMPLE 6

The radiographic intensifying screen obtained in Example 1 and the radiographic film obtained in Example 2 were combined therewith in a cassette to set such a screen-film system as the system shown in FIG. 1. The radiographic film was exposed to X-rays in the arrangement as shown in FIG. 2.

After the exposure to X-rays, the radiographic film was developed to obtain a visible image on the film.

COMPARISON EXAMPLE 3

The procedure of Example 6 was repeated except for setting a screen-film system (double-sided system) by combining two radiographic intensifying screens (trade name: Fuji GRENEX G4, available from Fuji Photo Film Co., Ltd.) and a double-sided radiographic film (trade name: ORTHO HR-L, available from the same) in a cassette in such a manner that the screens were arranged on both sides of the film, to obtain a visible image on the film.

The radiographic procedures in Example 6 and Comparison Example 3 were evaluated on the radiographic speed thereof and the sharpness and graininess of an image provided thereby according to the aforementioned tests. The results are set forth in Table 3.

TABLE 3

| | Relative Speed | Sharpness (%) | Graininess |
|---|---|---|---|
| Example 6 | 100 | 55 | $1.68 \times 10^{-2}$ |
| Com. Example 3 | 100 | 45 | $1.55 \times 10^{-2}$ |

As is evident from the results set forth in Table 3, the radiation image producing method using a radiographic film containing the particles of plate form according to the invention (Example 6) showed the same level of the radiographic speed as that of the method utilizing a conventional double-sided system in which phosphor particles having large diameters were arranged in the two screens on the film side (Comparison Example 3), although the method of the invention was a single-sided system. Further, the method of the invention showed much higher sharpness of an image provided thereby than the conventional method utilizing a double-sided system.

EXAMPLE 7

The radiographic intensifying screen I obtained in Example 1, the radiographic intensifying screen II obtained in Comparison Example 1 and a radiographic film (ortho film of fine particles for medical radiography, trade name: HR-A, available from Fuji Photo Film Co., Ltd.) were combined therewith in a cassette in such a manner that the film was sandwiched between the screen II positioned on the radiation impinging side (i.e., front side) and the screen I positioned on the back side of the film.

Thus, a screen-film system comprising a front screen, a radiographic film and a back screen shown in FIG. 5 was prepared.

COMPARISON EXAMPLES 4-7

Using two screens among the screen I, the screen II and the screen III (obtained in Comparison Example 3) and the same film as used in Example 6, a variety of screen-film systems having arrangements set forth in Table 4 were prepared in the same manner as described in Example 6.

TABLE 4

| | Front Side | Back Side |
|---|---|---|
| Example 4 | Screen II | Screen I |
| Com. Example 4 | Screen I | Screen II |
| Com. Example 5 | Screen I | Screen I |
| Com. Example 6 | Screen II | Screen II |
| Com. Example 7 | Screen III | Screen III |

Each of the screen-film systems was evaluated on the radiographic speed thereof and the sharpness and graininess of an image provided thereby according to the aforementioned tests. The results of the evaluations are set forth in Table 5.

TABLE 5

| | Relative Speed | Sharpness (%) | Graininess (D = 1.2) |
|---|---|---|---|
| Example 7 | 100 | 34.0 | $1.90 \times 10^{-2}$ |
| Com. Example 4 | 100 | 32.4 | $2.05 \times 10^{-2}$ |
| Com. Example 5 | 90 | 32.9 | $1.98 \times 10^{-2}$ |
| Com. Example 6 | 105 | 31.3 | $2.07 \times 10^{-2}$ |
| Com. Example 7 | 100 | 31.3 | $1.94 \times 10^{-2}$ |

As is evident from the results set forth in Table 5, the radiation image producing method using the screen-film system shown in FIG. 5 according to the invention (Example 7) provided an image of highly improved sharpness and graininess without lowering the radiographic speed.

In detail, the method of the invention (Example 7) showed the same level of the radiographic speed as that of the conventional method using conventional screens (Screen III) having a uniform particle diameter distribution in the thickness direction of the phosphor layer (Comparison Example 7), and was prominently improved in the sharpness and graininess of an image provided thereby than the conventional method. Further, the method of the invention was also prominently improved in the sharpness and graininess of an image provided thereby although the radiographic speed thereof is a little decreased, as compared with the conventional method using conventional screens (Screen II) in which phosphor particles of large diameters were arranged on the film (Comparison Example 6). That is, the method of the invention was well balanced in those three properties. Moreover, the method of the invention was much more excellent in all viewpoints of the radiographic speed thereof and the sharpness and graininess of an image provided thereby than the methods using other combinations of screens (Comparison Examples 4 and 5).

We claim:

1. A radiographic intensifying screen comprising a support and a phosphor layer provided on the support, in which phosphor particles are arranged in the phosphor layer in such manner that the diameters of the phosphor particles become larger along the depth direction of from the screen surface side to the support side.

2. The radiographic intensifying screen as claimed in claim 1, wherein said phosphor particles in the phosphor layer have a mean particle diameter ranging from 2 to 5 μm in the vicinity of the screen surface and a mean particle diameter ranging from 8 to 15 μm in the vicinity of the support.

3. The radiographic intensifying screen as claimed in claim 1, wherein said phosphor particles in the phosphor layer have a mean particle diameter ranging from 2 to 5 μm in the vicinity of the screen surface, a mean particle diameter ranging from 5 to 8 μm in the center of the phosphor layer, and a mean particle diameter ranging from 8 to 15 μm in the vicinity of the support.

4. The radiographic intensifying screen as claimed in claim 1, wherein said phosphor particles in the phosphor layer are particles of a terbium activated rare earth oxysulfide phosphor.

5. A radiation image producing method utilizing a screen-film system which comprises a radiographic film and a radiographic intensifying screen provided on one side of the radiographic film, wherein said radiographic intensifying screen comprises a support and a phosphor layer provided on the support, and phosphor particles are arranged in the phosphor layer in such manner that the diameters of the phosphor particles become larger along the depth direction of from the screen surface side near the radiographic film to the support side.

6. The radiation image producing method as claimed in claim 5, wherein said phosphor particles in the phosphor layer have a mean particle diameter ranging from 2 to 5 μm in the vicinity of the screen surface and a mean particle diameter ranging from 8 to 15 μm in the vicinity of the support.

7. The radiation image producing method as claimed in claim 5, wherein said phosphor particles in the phosphor layer have a mean particle diameter ranging from 2 to 5 μm in the vicinity of the screen surface, a mean particle diameter ranging from 5 to 8 μm in the center of the phosphor layer, and a mean particle diameter ranging from 8 to 15 μm in the vicinity of the support.

8. The radiation image producing method as claimed in claim 5, wherein said phosphor particles in the phosphor layer are particles of a terbium activated rare earth oxysulfide phosphor.

9. The radiation image producing method as claimed in claim 5, wherein said radiographic film comprises a support and an emulsion layer provided on one surface of the support and the emulsion layer contains silver halide particles of plate form.

10. The radiation image producing method as claimed in claim 5, wherein said radiographic film comprises a support and an emulsion layer provided on one suface of the support and the emulsion layer contains silver halide particles of plate form having a ratio of a mean thickness thereof to a mean diameter thereof in the range of 4 to 20.

11. The radiation image producing method as claimed in claim 9, wherein said radiographic film comprises a support and an emulsion layer provided on one surface of the support and the emulsion layer contains silver halide particles of plate form having a ratio of a mean thickness thereof to a mean diameter thereof in the range of 6 to 15.

12. A radiation image producing method utilizing a screen-film system which comprises a radiographic film and radiographic intensifying screens provided on the front and back sides of the radiographic film, wherein each of said radiographic intensifying screens comprises a support and a phosphor layer provided on the support, phosphor particles of the phosphor layer of the radiographic intensifying screen provided on a radiation impinging side are arranged in such manner that diameters of the phosphor particles become smaller along the depth direction of from the screen surface side facing the radiographic film to the support side, and phosphor particles constituting the phosphor layer of the radiographic intensifying screen provided on the opposite side of the radiation impinging side are arranged in such manner that diameters of the phosphor particles become larger along the depth direction of from the screen surface side facing the radiographic film to the support side.

13. The radiation image producing method as claimed in claim 12, wherein said phosphor particles in the phosphor layer of the radiographic intensifying screen provided on the radiation impinging side have a mean particle diameter ranging from 8 to 15 μm in the vicinity of the screen surface and a mean particle diameter ranging from 2 to 5 μm in the vicinity of the support.

14. The radiation image producing method as claimed in claim 12, wherein said phosphor particles in the phosphor layer of the radiographic intensifying screen provided on the radiation impinging side have a mean particle diameter ranging from 8 to 15 μm in the vicinity of the screen surface, a mean particle diameter ranging from 5 to 8 μm in the center of the phosphor layer, and a mean particle diameter ranging from 2 to 5 μm in the vicinity of the support.

15. The radiation image producing method as claimed in claim 12, wherein said phosphor particles in the phosphor layer of the radiographic intensifying screen provided on the opposite side of the radiation impinging side have a mean particle diameter ranging from 2 to 5 μm in the vicinity of the screen surface and a mean particle diameter ranging from 8 to 15 μm in the vicinity of the support.

16. The radiation image producing method as claimed in claim 12, wherein said phosphor particles in the phosphor layer of the radiographic intensifying screen provided on the opposite side of the radiation impinging side have a mean particle diameter ranging from 2 to 5 μm in the vicinity of the screen surface, a mean particle diameter ranging from 5 to 8 μm in the center of the phosphor layer, and a mean particle diameter ranging from 8 to 15 μm in the vicinity of the support.

17. The radiation image producing method as claimed in claim 12, wherein said phosphor particles of the phosphor layer of each radiographic intensifying screen are particles of a terbium activated rare earth oxysulfide phosphor.

18. The radiation image producing method as claimed in claim 12, wherein said radiographic film comprises a support and emulsion layers provided on both surfaces of the support.

* * * * *